United States Patent [19]

DiSanto et al.

[11] Patent Number: 5,508,720
[45] Date of Patent: Apr. 16, 1996

[54] PORTABLE TELECOMMUNICATION DEVICE WITH REMOVABLE ELECTROPHORETIC DISPLAY

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 190,648

[22] Filed: Feb. 2, 1994

[51] Int. Cl.$^6$ .................................................. G09G 5/00
[52] U.S. Cl. ........................................ 345/169; 345/107
[58] Field of Search ................................. 345/174, 107, 345/30, 179, 182, 183, 173, 169, 905; 340/825.69; 382/13; 395/111

[56] References Cited

U.S. PATENT DOCUMENTS

| | | |
|---|---|---|
| 4,121,244 | 10/1978 | Takeuchi et al. . |
| 4,542,375 | 9/1985 | Alles et al. . |
| 4,639,720 | 1/1987 | Rympalski et al. ............... 345/174 |
| 4,639,729 | 1/1987 | Rympalaski et al. . |
| 4,653,086 | 3/1987 | Laube . |
| 4,764,885 | 8/1988 | Greanias et al. . |
| 4,794,634 | 12/1988 | Torihata et al. . |
| 4,803,652 | 2/1989 | Maeser et al. ............... 345/169 |
| 4,812,833 | 3/1989 | Shimauchi . |
| 4,814,760 | 3/1989 | Johnston et al. . |
| 4,853,682 | 8/1989 | Asano et al. ............... 345/169 |
| 4,870,677 | 9/1989 | Di Santo et al. ............... 345/107 |
| 4,890,096 | 12/1989 | Taguchi et al. . |
| 4,947,156 | 8/1990 | Sato et al. . |
| 4,958,148 | 9/1990 | Olson . |
| 4,963,859 | 10/1990 | Parks . |
| 4,980,646 | 12/1990 | Zemel . |
| 4,990,900 | 2/1991 | Kikuchi . |
| 5,049,862 | 9/1991 | Dao et al. ............... 345/179 |
| 5,051,736 | 9/1991 | Bennett et al. . |
| 5,063,600 | 11/1991 | Norwood . |
| 5,148,155 | 9/1992 | Martin et al. . |
| 5,162,782 | 11/1992 | Yoshioka . |
| 5,178,420 | 1/1993 | Shelby . |
| 5,214,622 | 5/1993 | Nemoto et al. ............... 340/825.69 |
| 5,262,759 | 11/1993 | Moriconi et al. ............... 345/30 |

FOREIGN PATENT DOCUMENTS

| | | |
|---|---|---|
| 4-1798 | 1/1992 | Japan ............... 345/905 |

OTHER PUBLICATIONS

"Pen Pals" by Christopher Barr et al, PC Magazine pp. 117 et seq. Oct. 12, 1993.

*Primary Examiner*—Curtis Kuntz
*Assistant Examiner*—Vivian Chang
*Attorney, Agent, or Firm*—Plevy & Associates

[57] ABSTRACT

The present invention is a modular electrophoretic display that can be selectively attached or detached from a larger assembly. The modular electrophoretic display includes a small, low voltage battery that provides a small bias to the anode, cathode and grid electrode of the electrophoretic display when no other power is present. As a result of the bias of the battery, the electrophoretic display is capable of retaining any image formed upon the display by the larger assembly. Consequently, different displays with differing images can be removed from, or added to, the larger assembly as needed. This promotes ease in photocopying the electrophoretic display and enables the display to be mailed, stored or otherwise handled without the loss of the image.

18 Claims, 4 Drawing Sheets

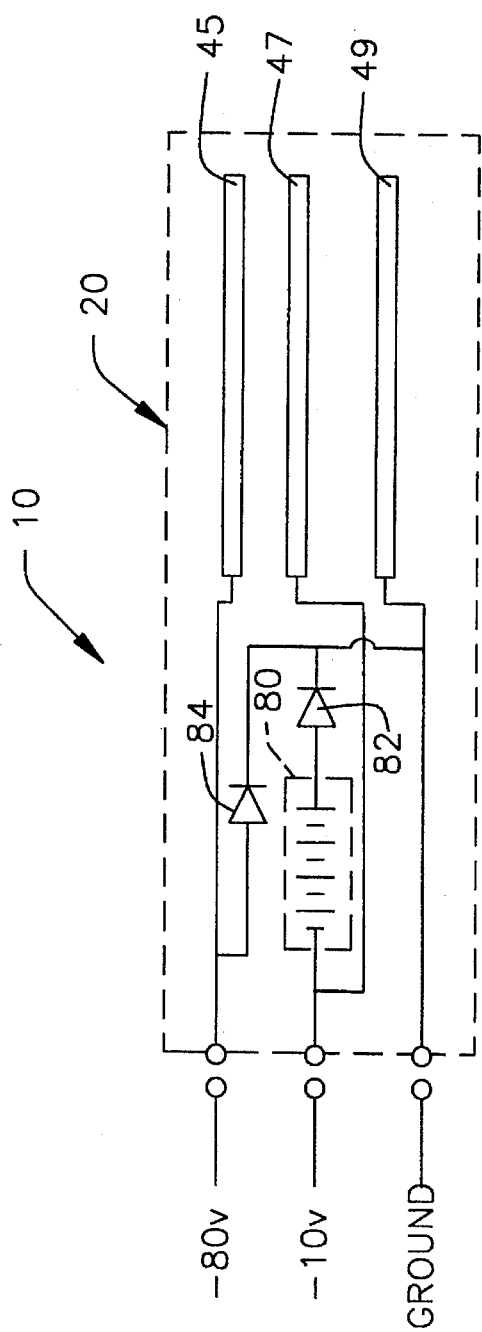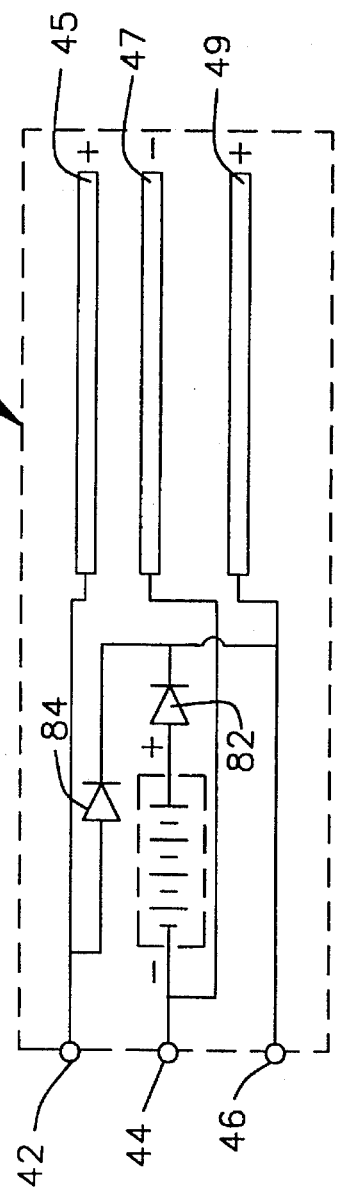

PORTABLE TELECOMMUNICATION DEVICE WITH REMOVABLE ELECTROPHORETIC DISPLAY

FIELD OF THE INVENTION

The present invention relates to a multifunctional, portable telecommunication device that enables a person to send and receive telephone communications and/or facsimile transmissions at a remote location, via a cellular telecommunications network. More particularly, the present invention relates to a device where facsimile transmission or other graphic display can be created or stored on a removable electrophoretic display, thereby facilitating the easy removal of the display without loss of the display image.

BACKGROUND OF THE INVENTION

Telecommunications is a rapidly changing field of technology. Consequently, the field of telecommunications is replete with prior art references that show advancements in most every piece of equipment associated with the telecommunications industry. The most noticeable advancements to the field of telecommunications may be those occurring to the simple telephone. In recent years, the telephone has undergone a transformation from a simple way to communicate to a far more sophisticated apparatus that utilizes multimedia technologies. With the advent of cellular telecommunications networks, portable telephones and car telephones have become commonplace. Similarly, with the advent of facsimile transmission technology, "fax" machines have become commonplace, as are telephones integrated with fax machines. However, telephones are no longer being considered just voice or facsimile transmitters and receivers. Rather, telephones are now being integrated into highly sophisticated portable computers, thereby transforming the simple telephone into a more versatile multimedia device. For instance, certain telephones are being manufactured with large display screens and sophisticated microprocessors that store and run complex software. As such, the person may use the device either as a telephone or as a personal computer, running any software currently available. Such software is capable of creating complex graphic images on the display screen of the device, wherein, with a few simple commands, the information on the display screen can be transmitted as a facsimile transmission. Similarly, any such prior art device can receive facsimile transmissions sent to it, via a cellar telecommunication network or a hard-wire telephone line interface. Such portable devices that are part telephone, part facsimile machine and part personal computer are sometimes referred to as personal digital assistants (PADs) an example of which is being sold by A.T.&T. under the mark EO 440 Personal Communicator. A listing and description of most commercially marketed portable hand-held computer devices with pen-write screens is made in an article by Christopher Barr et al. entitled *Pen Pals*, PC Magazine Volume 12, Number 17 pgs. 116 et seq. (October 1993).

Although the innovations in telephone equipment technology result in a far more versatile and useful telecommunications tool, the products currently being produced do contain certain disadvantages. For instance, many prior art multimedia telephones require a special stylus to create graphic images on the electronic display of the device. As a result, there is no hard copy of what is being entered onto the electronic display. Consequently, to obtain a hard copy of what is shown on the display, the device must be either coupled to a printer or the information downloaded to a disk which must then be taken to another computer and printed. It is conceivable that such prior art multimedia devices may have the capacity to print directly on to paper, much in the same way that facsimile machines print onto paper. However, such multimedia devices are typically portable and lightweight. As a result, the ability to retain a removable amount of paper is limited, as is its ability to drive a high quality printing head.

In the prior art, the electronic display of many multimedia telephones are typically liquid crystal displays (LCDs). LCDs do not have a high degree of resolution. As a result, the graphical image produced on the LCD is often not clear. Additionally, very small details or text written in small fonts are often illegible when displayed on an LCD. As a result, if a complex document or blueprint is being viewed or faxed, important information may be lost by the deficiencies of the resolution in the screen. Another deficiency of LCDs is that the image they produce is typically distorted as the LCD is touched. Since the LCD is being written upon by a stylus, the pressure of the stylus may distort the image being displayed, thereby causing difficulties in producing graphical images of exacting detail.

Another problem with prior art multimedia telephones is that it only has a single screen. Many documents, facsimile transmissions and the like are several pages long. As a result, only one page at a time can be displayed. To produce hard copies of the pages, each page must be downloaded to a printer. Since multimedia telephones are portable, hard copies of the image on the electronic display can be made by photocopying the display. However, the LCD displays do not always provide a great contrast between the background and the image. Consequently, the photocopied image is not always clear. Additionally, although multimedia telephones are portable, they are far from flat. It is therefore difficult to properly place the display of such a device upon a photocopy machine.

The present invention provides improvements to the art of multimedia telephones by providing a tactile screen that enables a piece of paper to be placed over the screen and written upon by an ordinary pen or pencil. As a result, a simultaneous hard copy can be obtained on paper of what is being entered into the electronic display. Furthermore, the electronic display is not distorted by tactile pressure. Consequently, the pressure of a pen or pencil on the screen would not distort the image displayed. Electronic displays that utilize pads capable of being engaged by an ordinary pen or pencil are known in the art as exemplified by U.S. Pat. No. 4,963,8591. Parks entitled METHOD AND APPARATUS FOR CAPTURING INFORMATION IN DRAWING OR WRITING, and U.S. Pat. No. 4,980,646 to Zemel, entitled IMPEDANCE TOMOGRAPHIC TACTILE SENSOR. However, such tactile pads are not adapted for use with displays of a high resolution since the resolution of the tactile pad is typically far inferior to the resolution of the display, thereby adversely effecting the performance of the display. Furthermore, these tactile pads are not transparent and cannot be used over an electronic display.

It is therefore an object of the present invention to provide a multimedia telephone with a tactile pad that has a resolution that is at least as great as the resolution of the display itself. As such, the image produced on the display is not adversely affected by the resolution of the tactile pad being engaged.

It is a further object of the present invention to provide a multimedia telephone device with a removable electrophoretic display, wherein the display can be removed, photocopied and returned to the telephone without loss of the image on the display.

SUMMARY OF THE INVENTION

The present invention relates in general to any electronic device having a display, wherein the display can be removed from the device without loss of the image on the display. More particularly, the present invention relates to portable telecommunications devices with removable displays that are capable of transmitting and receiving telephone messages as well as facsimile transmissions.

The present invention apparatus includes a modular electrophoretic display that can be selectively attached or detached from a larger assembly. The modular electrophoretic display includes a small, low voltage battery that provides a small bias to the anode, cathode and grid electrode of the electrophoretic display when no other power is present. As a result of the bias of the battery, the electrophoretic display is capable of retaining any image formed upon the display by the larger assembly. Consequently, different displays with differing images can be removed from, or added to, the larger assembly as needed. This promotes ease in photocopying the electrophoretic display and enables the display to be mailed, stored or otherwise the loss the image.

In a preferred embodiment, the modular electrophoretic display is contained within a portable telecommunications device. When the modular electrophoretic display is connected to the telecommunications device, the electrophoretic display is viewed through a transparent tactile pad. Both the tactile pad and the electrophoretic display are coupled to an image driver, whereby any tactile manipulations upon the tactile pad are converted into a corresponding image on the electrophoretic display. Since the display is disposed directly below the tactile pad, a person has the illusion of writing directly onto the electrophoretic display. The preferred telecommunications device embodiment also includes a cellular telephone transmitter/receiver, whereby any image produced on the electrophoretic display can be transmitted as a facsimile transmission. Similarly, any facsimile transmission sent on the cellular phone network can be received and displayed on the electrophoretic display, wherein the electrophoretic display can be removed and the display information used at a later time.

BRIEF DESCRIPTION OF THE DRAWINGS

For a better understanding of the present invention, reference is made to the following description of an exemplary embodiment thereof, considered in conjunction with the accompanying drawings, in which:

FIG. 2a is a schematic showing the flow of the power to the electrophoretic display when coupled to the primary housing and the external power source contained therein;

FIG. 2b is a schematic showing the flow of power to the electrophoretic display from a battery when the electrophoretic display is not coupled to an external power source;

DETAILED DESCRIPTION OF THE PRESENT INVENTION

Although the aspects of the present invention can be used in many different applications where it is desirable to write on an electronic screen, such as lap top computers, personal digital assistants (PDAs) and the like, the present invention is especially suitable for use in a multimedia telephone device. Accordingly, the present invention will be described within a multimedia telephone/telecommunications application.

Figure 1:
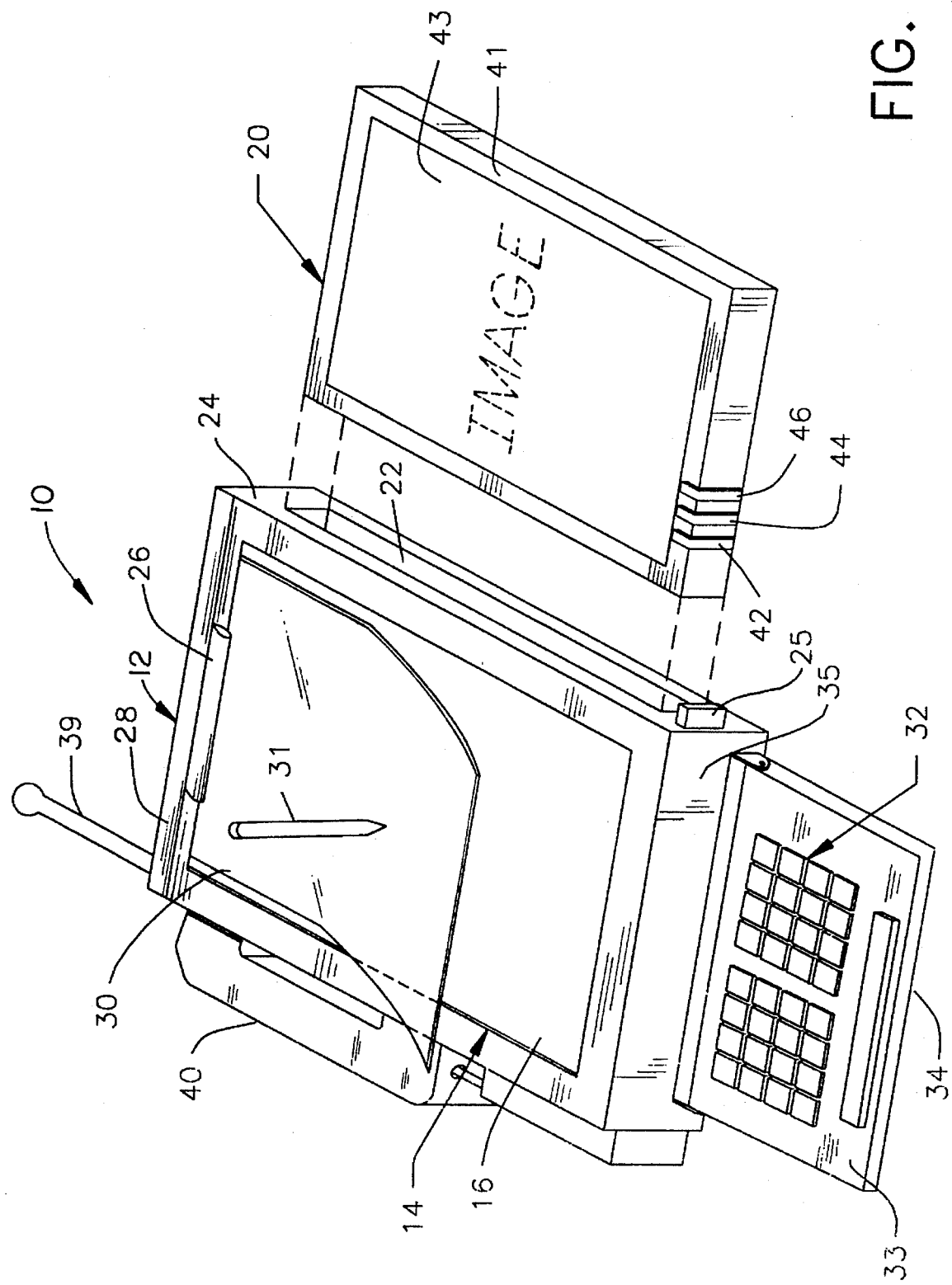
FIG. 1 is a perspective view of one preferred embodiment of the present invention, wherein the electrophoretic display is shown separated from the primary housing to facilitate consideration and discussion.

Referring to FIG. 1 there is shown one preferred embodiment of the present invention multimedia telephone/telecommunications device 10. The device 10 is a portable unit having a housing 12 that includes a large video display window 14. The video display window 14 is preferably covered with a transparent tactile input pad 16. An electrophoretic image display (EPID) 20 is positioned below the transparent tactile input pad 16 in a manner that allows images produced on the EPID 20 to be viewed through the transparent tactile input pad 16. The EPID 20 is an independent assembly that can be selectively removed or added to the overall device 10. In the shown embodiment, the EPID 20 is a rectangular structure with a narrow width that is inserted into the housing 12 via an aperture 22 formed in the side surface 24 of the housing 12. The EPID 20 can be ejected from the housing 12 by engaging the ejection button 25 on the housing 12, whereby the EPID 20 contained within the housing 12 can be ejected from the housing 12 back through the aperture 22.

A clip 26 is disposed on the top surface 28 of the housing 12 directly above the video display window 14. The clip 26 is capable of retaining a sheet of paper 30 over the transparent tactile input pad 16. As will later be explained, a person can write upon the sheet of paper 30 with an ordinary pen or pencil 31. The pressure of the pen or pencil 31 on the paper 30 is transferred to the below lying transparent tactile input pad 16. As a result, the image written or drawn onto the paper 30 is converted into an electronic signal and is reproduced as an image on the EPID 20. Once the EPID 20 has a desired image produced upon it, the EPID 20 can be ejected from the housing 12 and replaced. The image on the rejected EPID 20 will remain, thereby allowing the EPID 20 to be easily photocopied, stored, mailed or the like.

The telephone/telecommunications device 10 preferably also includes an alphanumeric key pad 32. In the shown embodiment, the key pad 32 is disposed on a movable platform 33 that extends from the housing 12. When not in use, the keypad 32 can be pushed into the housing 12 so that the bottom edge 34 of the keypad 32 lays flush with the bottom edge 35 of the housing 12. The keypad 32 itself may be a standard computer keyboard setup such as those used in lap top computers. Alternatively, the keypad 32 may be simplified having only a few keys such as the alphanumeric key pads found on most touch tone telephones. It will be understood that the keypad 32 need not be disposed on a movable platform 33 as shown, but rather can be disposed on the top surface 28 of the housing 12 below the video display window 14. As a result, the housing 12 would be slightly longer than is shown to accommodate the keys of the keypad. In yet another alternate embodiment, the keypad may be detachable from the housing 12, tethered by a cable, so that the keypad can be oriented as desired in relation to the EPID 20.

By utilizing the keypad 32 the present invention device 10 can be used as a personal computer whereby text can be typed into the keypad or both text and graphics can be generated by software or downloaded from memory. Regardless, as to whether the images on the EPID 20 are generated by the transparent tactile input pad 16, keypad 32 or are computer generated, the text and images displayed on the EPID 20 can be transmitted over a cellular telecommunication network as a facsimile transmission. Similarly, an incoming facsimile transmission, via a cellular telecommunications network, can be received by the present invention device 10 and displayed on the EPID 20. To facilitate the interaction of the telephone/telecommunications device 10 with a cellular telecommunications network, the present invention device also comes equipped with a telephone handset 40 and a transmission/receiver antenna 39. The presence of the telephone handset 40 also enables the present invention device 10 to be used just like a typical cellular telephone.

The technology of transmitting a graphics image as a facsimile transmission is well known and practiced in the art, as is the technology of receiving, a facsimile transmission and displaying it as a graphics image. As a result, the circuitry required to perform such functions are considered well known to a person skilled in the art, and need not be described herein at length.

The present invention telephone/telecommunications device 10 uses a removable electrophoretic image display EPID 20. Although FIG. 1 only shows a single EPID 20, it should be understood that multiple EPIDs can be used, wherein the multiple EPIDs are loaded into the housing 12 and are stacked one on top of another within the housing 12. As a result, when one EPID is removed, the next EPID becomes visible through the video display window 14. EPIDs are capable of being manufactured so that they are only a few millimeters thick. As a result, several EPIDs can be stacked on top of one another within a relatively thin housing.

The electrophoretic effect is well known and the prior art is replete with a number of patents and articles which describe the effect. As will be recognized by a person skilled in the art, the electrophoretic effect operates on the principle that certain particles, when suspended in a medium, can be electrically charged and thereby caused to migrate through the medium to an electrode of opposite charge. Electrophoretic image displays (EPIDs) utilize the electrophoretic effect to produce desired images. In prior art EPIDs, colored dielectric particles are suspended in a fluid medium that is either clear or of an optically contrasting color as compared to the dielectric particles. The colored electrophoretic particles are then caused to selectively migrate to, and impinge upon, a transparent screen, thereby displacing the fluid medium against the screen and creating the desired image. The physical structure of an EPID is well known in the art as exemplified by U.S. Pat. No. 4,655,897 to DiSanto et al. entitled ELECTROPHORETIC DISPLAY PANELS AND ASSOCIATED METHODS and U.S. Pat. No. 5,077,157 also to DiSanto et al. entitled, METHOD OF FABRICATING DUAL ANODE, FLAT PANEL ELECTROPHORETIC DISPLAYS, both of which are assigned to Copytele, Inc., the assignee herein. An example of a prior art EPID as used in conjunction with telephone/telecommunications equipment is shown in U.S. Pat. No. 4,870,6771 to DiSanto et al., entitled DATA/FACSIMILE TELEPHONE SUBSET APPARATUS INCORPORATING ELECTROPHORETIC DISPLAYS and assigned to Copytele, Inc. the assignee herein.

As is known in the art, EPIDs have anode lines, cathode lines and grid lines, that communicate with an electrophoretic dispersion. The cathode lines are typically transparent lines of indium-tin-oxide disposed on a transparent glass plate. During operation, the biases of the anode lines, grid lines and cathode lines are controlled to cause the electrophoretic particles in the dispersion to selectively impinge upon the transparent glass plate, thereby creating the desired image by selectively obscuring the glass plate. In the present invention, the EPID 20 is a modular unit that is selectively removable from the housing 12 of the telephone device 10. As can be seen from FIG. 1, the EPID 20 has a frame 41 surrounding its structure. The frame 41 defines the periphery of the glass plate 43 upon which the images of the EPID 20 are displayed. Disposed on the frame 41 are three electrical contact points 42,44,46. The contact points 42,44, 46 are electrically coupled to the anode lines, grid lines and cathode lines, respectively, contained within the EPID 20. When the EPID 20, is inserted into the housing 12, the contact points 42,44,46 contact complimentary contacts (not shown) within the housing 12. As a result, the contact points 42,44,46 become electrically interconnected to the housing 12, wherein power can be supplied to the EPID 20 and graphic display information can be sent to, or retrieved from, the EPID 20.

One of the primary advantages of utilizing an EPID 20 is that the images and text displayed on the EPID 20 are not lost when power is removed from the display. As a result, the EPID 20 can be removed from the housing 12 and disconnected from its source of power without the graphics or text displayed on the EPID 20 being lost. The EPID 20 can therefore be removed from the housing 12, photocopied, stored, transported or otherwise handled without loss to the display image. Since the EPID 20 is a relatively thin planar structure, it is easily photocopied, stored, mailed or the like. Although an EPID does not need power to retain a displayed image, the displayed image may be adversely affected if the EPID is shaken or otherwise harshly agitated. Since the EPID does not have power, there is no electrical bias retaining the electrophoretic particles in place. Since it is the position of the electrophoretic particles that create the displayed image, any violent manipulation of the EPID may dislodge the electrophoretic particles and adversely effect the displayed image.

To prevent the problems of the electrophoretic particles becoming dislodged, each of the EPIDs 20 used in conjunction with the present invention contain a low power battery. As will be explained this battery provides a slight bias to the anode lines; grid lines and cathode lines contained within the EPID 20, thereby retaining the electrophoretic particles in place despite the agitation of the EPID 20. Consequently, the EPID 20 can be photocopied, stored, mailed or otherwise handled without loss to the display image. Since the EPID 20 is capable of retaining a graphic image and or text without external power, specialized EPIDs with pre-created forms may be used in conjunction with the present invention device 10. For instance, an EPID with a standard form, such as a tax form, may be loaded into the housing 12 of the present invention device 10. The form can then be filled out by writing over the transparent tactile input pad 16. The completed form can then be ejected and removed, or, with a touch of a button, the completed form can be transmitted as a fax transmission or stored in a computer memory for later use.

Referring to FIG. 2a, there is shown a schematic of the EPID 20 coupled within the housing 12 of the present invention device 10. The EPID 20 contains an anode Vss line 45, a grid Vss line 47 and a cathode Vss line 49 as is typical for most EPIDs. When coupled within the housing by contacts 42, 44, 46, the anode Vss line 45 is typically provided with a bias of −80 volts during the operation of the EPID. Similarly, the cathode Vss line 49 is coupled to ground while the grid Vss line 47 is generally held at a bias of −10 volts. In the shown embodiment, a low voltage battery 80 is coupled between the grid Vss line contact 44 and both the anode Vss and cathode Vss lines 45, 49. The battery 80 is oriented so that a low voltage positive bias is supplied to both the anode and cathode Vss lines 45,49. A first diode 82 is disposed between the battery 80 and the cathode Vss line 49, wherein the positive terminal of the battery 80 is coupled to the anode of the diode 82 and the cathode Vss line 49 is coupled to the cathode of the diode 82. A second diode 84 is disposed between the cathode of the first diode 82 and the anode Vss line 45. The second diode 84 is oriented so that the cathode of the second diode 84 is coupled to both the cathode of the first diode 82 and the cathode Vss line 49.

As can be seen from FIG. 2a, when the EPID 20 is coupled to the housing 12 and is empowered, the anode Vss line 45 is negatively biased in relation to both the grid Vss line 47 and the cathode Vss line 49. The anode Vss line 45 is typically biased at −80 volts. In a preferred embodiment, the battery 80 is only between 1.5–3.0 volts. As a result, the −80 volt bias provided to the anode Vss line 45 is predominant over the small positive biases provided by the battery 80. Since the negative biases of the anode Vss line 45 is predominant, the first and second diodes 82, 84 are reversed biased and the battery 80 is electrically isolated, having in essence no function.

Referring to FIG. 2b, the EPID 20 is shown disconnected from the housing. As such, no external bias is applied to the contacts 42,44,46. Since the external biases are removed, the first and second diodes 82, 84 are forward biased, whereby a negative bias is supplied to the grid Vss line 47 relative to both the anode Vss line 45 and the cathode Vss line 49. In the EPID 20 shown, a positive charge attracts electrophoretic particles and a negative charge repels the same. By applying a positive charge to both the anode Vss line 45 and the cathode Vss line 49 relative to the grid Vss line 47, the electrophoretic particles remain in the position in which they lay. Consequently, the electrophoretic particles do not move as the EPID 20 is agitated and any image that is present on the EPID 20 remains.

It will be understood that the use of two diodes and a battery to supply a small bias to an EPID is merely exemplary, and other functionally equivalent circuits utilizing a battery and FETs or other transistors can be readily substituted.

Another advantage of utilizing an EPID 20 is that EPIDs have a typical resolution in the range of 200 lines per inch. This resolution is far greater than ordinarily available liquid crystal displays or the like. Consequently, the present invention device is capable of sending, receiving and/or displaying information of fine detail without losses due to poor display resolution.

Yet another advantage of utilizing an EPID in the present invention is that an image displayed on the EPID 20 is not adversely effected by the pressure of a pen or pencil 31, (FIG. 1) writing upon the EPID 20. As a result, a person can write fine details into an image on the EPID 20 without adversely effecting the image already present. Additionally, many prior art devices utilize a hall effect stylus to right upon the electronic displays. Such styluses typically produce large lines that make it difficult to write in a small font or with fine detail. The present invention device 10 utilizes a common ballpoint pen. Consequently, a person can write with the same detailed resolution as is available for a ballpoint pen on plain paper.

Figure 3:
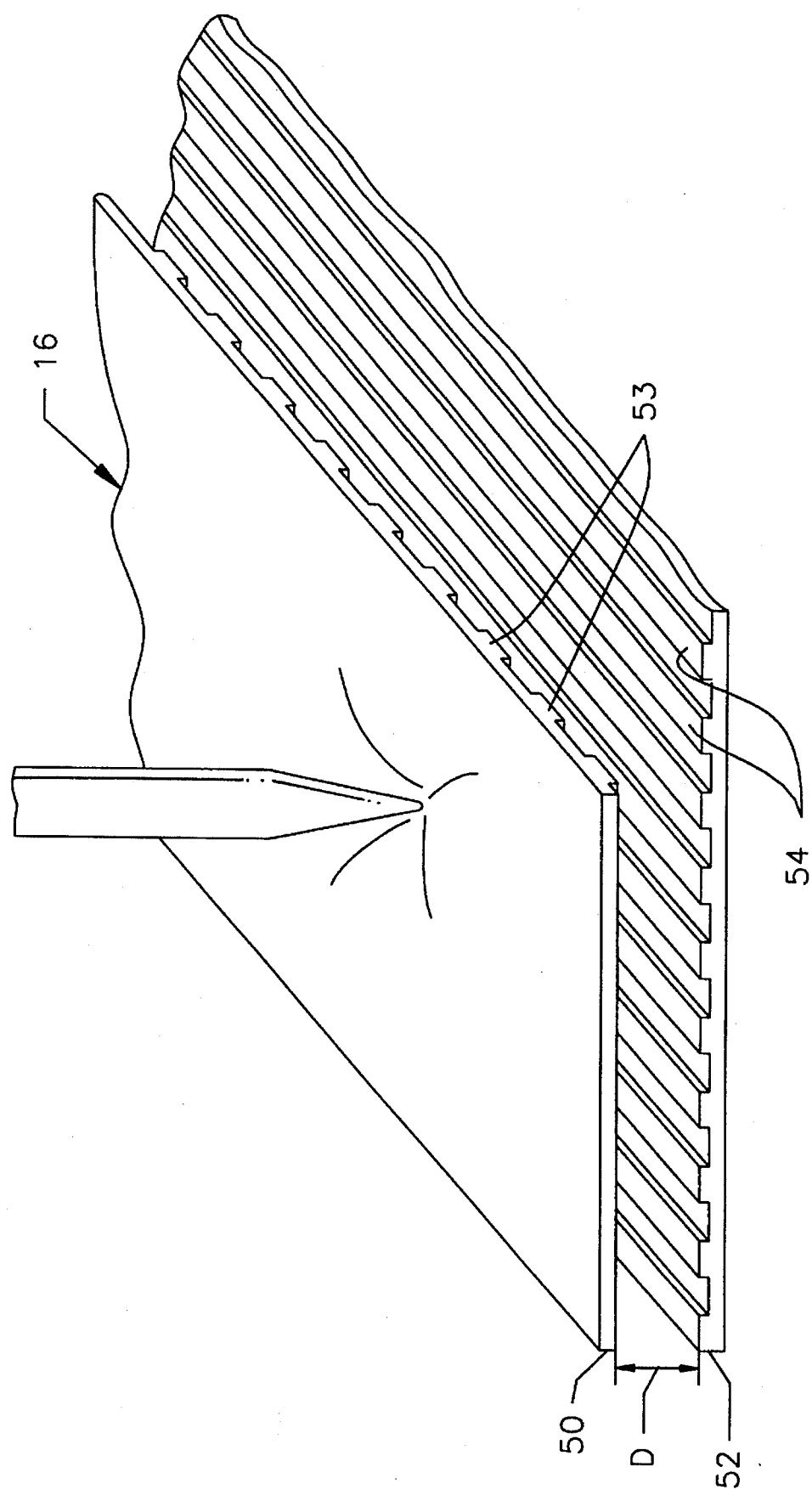
FIG. 3 is a perspective view of a small fragmented region of a transparent tactile pad in accordance with one preferred embodiment of the present invention.

Returning to FIG. 1, the transparent tactile input pad 16 has a resolution that is at least as fine as that of the below lying EPID 20. As a result, if the EPID 20 has a resolution of 200 lines per inch, the tactile input pad 16 should also have a resolution of 200 lines per inch. By matching the resolutions between the tactile input pad 16 and the EPID 20, it is assured that what is written onto the tactile pad 16 is accurately transferred onto the EPID 20. Many types of tactile input pads exist within the prior art. However, most prior art tactile input pads are not transparent. The technology needed to produce a transparent tactile input pad of a high resolution is very similar to the technology needed to manufacture electrophoretic image displays. Referring to FIG. 3, there is shown a small cut-a-way segment of one preferred embodiment of the transparent tactile input pad 16. From FIG. 3, it can be seen that the tactile input pad 16 is comprised of two transparent substrates 50, 52 spaced a small distance D apart in parallel planes. The upper substrate 50 has a plurality of parallel conductive lines 53 disposed along its inner surface. The conductive lines 53 are preferably made of a layer of indium-tin-oxide (ITO). The conductive lines 53 of ITO are approximately 300 angstroms in thickness. At this thickness, the conductive lines 53 of ITO are relatively transparent. Identical conductive lines 54 are formed on the inner surface of the bottom substrate 52. However, the bottom conductive lines 54 are arranged in an orientation that is perpendicular to the conductive lines 53 on the top substrate 50. Consequently, the lines within the tactile input pad 16 form an X-Y matrix when the X-lines and Y-lines are disposed on separate transparent substrates. Since each of the substrates 50, 52 are transparent and the conductive lines 53, 54 of ITO disposed on the substrates are also transparent, the entire tactile input pad 16 is transparent. As a result, the EPID which lays below the tactile input pad 16 can be clearly viewed.

As a person writes upon the tactile input pad 16 with a pen or a pencil, the pressure from the pen pushes the upper substrate 50 against the lower substrate 52 just in the area directly below the pen. As a result, the pen pressure causes a conductive line or lines 53 on the upper substrate 50 to contact a conductive line or lines 54 on the bottom substrate 52. Consequently, there is contact between the lines and a signal can be produced that corresponds to the point of contact in the X-Y matrix.

Figure 4:
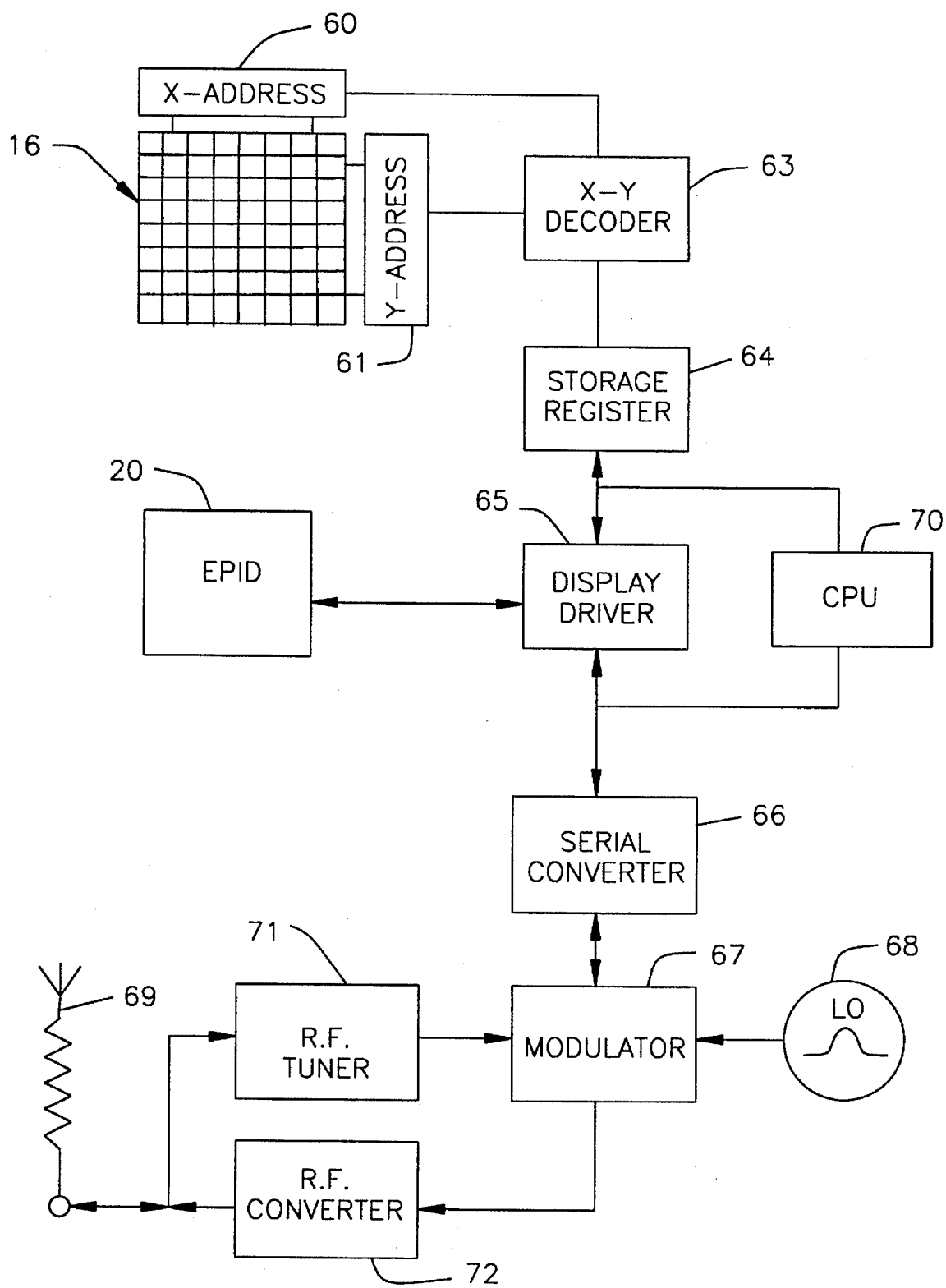
FIG. 4 is a block diagram showing the components and preferred method of operation of the embodiment of the present invention, as shown in FIG. 1.

Referring to FIG. 4, it can be seen that as a person writes on the tactile input pad 16 with a pen, the X-coordinate and Y-coordinate of the position of the pen is read by an X-address circuit 60 and a Y-address circuit 61, respectively. The X-address and Y-address are read into an X-Y decoder 63 which converts the X-address and the Y-address into a parallel code, which in turn is saved in a storage register 64. The information stored in the storage register 64 is read by a graphics display driver 65. The graphics display driver 65 converts the signals from the storage register 64 into video signals which can be displayed on the EPID 20. The tactile input pad 16 is disposed directly above the EPID 20. Furthermore, the images displayed on the EPID 20 are identical in shape, size and location to the pen strokes on the tactile input pad 16, thereby giving the illusion that the pen is writing directly into the display. As has been previously explained, the present invention telephone/telecommunications device 10 may include sophisticated computing capabilities that allow the device to run software and otherwise act as a personal computer. As a result, the present invention may include a C.P.U. 70. The C.P.U. 70 can be a compact programmable microprocessor, such as those found in lap top computers, or the C.P.U. 70 can be a dedicated microprocessor having less computative abilities. The C.P.U. 70 may be used to assist a person in using the present invention device 10 by supplementing the matter being written onto the tactile pad 16. For example, the C.P.U. 70 may provide selectable menus that assist a person in drawing a chart, graph, spreadsheet or the like. Similarly, the C.P.U. 70 may provide the user with a word processing program to assist a person with writing and editing text. The C.P.U. 70 may also provide the user with commonly used forms, such as a fax transmittal cover sheet, which can be recalled from memory and displayed. The field of computer software is replete with programs that provide various forms and/or assist a person in producing and editing textual and graphic information. Any such software can be run by the C.P.U. 70, wherein a person interacts with the software by writing upon the tactile input pad 16 or typing commands upon the alphanumeric keypad 32.

Regardless to whether or not the images produced on the EPID 20 are created by the tactile input pad 16, C.P.U. 70 or both, the present invention has the capacity to transmit the image on the EPID 20 as a facsimile transmission. As is shown by FIG. 4, any image from the display driver 65 of the EPID 20 can be read into a serial code converter 66 that converts the parallel code into a serial code. The serial code is then read into a modulator 67 that is controlled by a local oscillator 68. The modulated serial code is then read into a R.F. converter 72, wherein the modulated serial code is converted to a R.F. signal that can be transmitted via antenna 69. Accordingly, any image displayed on the EPID can be transmitted to any other point as a cellular telephone fax transmission.

The present invention device 10 is also capable of receiving a cellular telephone fax transmission. A R.F. tuner 71 is coupled to the antenna 69. When a cellular telephone fax transmission is received by the antenna 69, the R.F. tuner 71 is used to produce the corresponding R.F. signal. The received R.F. signal is then converted into a serial code by the modulator 67 and local oscillator 68. The serial code converter 66 reads the serial code and converts the same into a parallel code. The parallel code created by the serial code converter 66 is then read by the display driver 65 that displays the fax transmission to the EPID 20. Once displayed, the EPID 20 can then be removed from the present invention device and photocopied, stored or otherwise processed.

It is understood that the embodiment described herein is merely exemplary and that a person skilled in art may make variations and modifications to the various element of the present invention utilizing functionally equivalent components. As such, it is understood that the present invention concept of having a removable EPID need not be used in conjunction with a telecommunications device, but rather can be part of a computer, copier or any other electronic device that utilizes a visual display. The use of such as part of a telecommunications device is intended to show the preferred embodiment that is indicative of the best mode conceived by the applicant. Other features of the described embodiment, such as the function of any software in manipulating the image upon the EPID, may of course also be altered by a person skilled in the art. All such variations and modifications are intended to be covered within the spirit and the scope of the present invention as defined by the appended claims.

What is claimed is:

1. An improved electronic apparatus having a visual display, comprising:
    a detachable electrophoretic display assembly that includes an anode, cathode and grid electrode and at least one battery for maintaining a predetermined bias on said anode, cathode and grid electrode only when said electrophoretic display is detached from an external source of power;
    a housing adapted to selectively receive said detachable electrophoretic display, said housing containing an external source of power for empowering said electrophoretic display and a display driver for producing predetermined images on said electrophoretic display, whereby the bias of said at least one battery prevents the movement of said predetermined images on said electrophoretic display without said display driver, when said electrophoretic display is detached from said housing.

2. The apparatus according to claim 1, further including a writing tablet assembly, coupled to said housing, wherein images written onto said writing tablet assembly are produced on said electrophoretic display when the electrophoretic display is attached to said housing.

3. The apparatus according to claim 2, wherein said writing tablet assembly is generally transparent and is disposed over said electrophoretic display when said etectrophoretic display is attached to said housing.

4. The apparatus according to claim 3, wherein said writing tablet assembly includes a tactile pad.

5. The apparatus according to claim 2, wherein said writing tablet assembly overlays said electrophoretic display; and said apparatus further including a microprocessor and a keypad, wherein said microprocessor controls said producing of said predetermined images on said electrophoretic display and wherein said images written onto said writing tablet assembly to produce said images on said electrophoretic display, enhance said predetermined images.

6. The apparatus according to claim 1, further including a cellular telephone transmitter means for transmitting said predetermined images on said electrophoretic display as a facsimile transmission.

7. The apparatus according to claim 6, further including a cellular telephone receiver means for receiving a facsimile transmission and displaying the facsimile transmission on said electrophoretic display.

8. The apparatus according to claim 1, wherein said housing is adapted to selectively receive a plurality of electrophoretic displays, wherein each of the electrophoretic displays can be selectively detached from said housing.

9. The apparatus according to claim 1, wherein said detachable electrophoretic display further includes a means for removing the bias of said at least one battery from said anode, cathode and grid electrode when said electrophoretic display is attached to said housing and coupled to the source of power contained therein.

10. The apparatus according to claim 1, wherein said electronic apparatus is a portable telecommunications device that includes a telephone receiver.

11. An apparatus, comprising:
    a housing having at least one window disposed therein;
    a transparent tactile pad disposed within said at least one window;
    a modular electrophoretic display capable of being removably received within said housing, wherein said electrophoretic display is positionable at a first orientation within said housing directly below said transparent tactile pad, whereby said electrophoretic display can be viewed through said transparent tactile pad; and image driver means coupling said conductive lines of said tactile pad and to said electrophoretic display is within said housing at said first orientation, wherein tactile engagement of the transparent tactile pad creates a corresponding image on said electrophoretic display; and means coupled to said electrophoretic display for preventing the movement of said corresponding image on said electrophoretic display when said electrophoretic display is removed from said housing.

12. The apparatus according to claim 11, wherein said electrophoretic display includes anode, cathode and grid electrode and said means for preventing the movement of said corresponding image includes a battery that provides a predetermined bias to said anode, cathode and grid electrode only when said electrophoretic display is detached from said housing.

13. The apparatus according to claim 11, further including a means for retaining at least one sheet of paper over said transparent tactile pad, whereby the pressure of a person writing on the sheet of paper is experienced by the tactile pad and said corresponding image is generated on said electrophoretic display.

14. A modular electrophoretic display for use in an electronic apparatus, wherein the electrophoretic display can be selectively detached from the electronic apparatus, said electrophoretic display comprising:

anode lines, cathode lines and grid electrode lines;

bias means for biasing said anode lines, cathode lines and grid electrode lines at predetermined voltage potentials to prevent the movement of a predetermined image previously produced on said electrophoretic display by said electronic apparatus when said electrophoretic display is selectively detached; and means for removing said predetermined voltage potentials when said electrophoretic display is coupled to said electronic apparatus.

15. The electrophoretic display according to claim 14, wherein said bias means includes a battery.

16. The electrophoretic display according to claim 14, wherein said bias means comprises first and second diodes each having an anode and a cathode; and a battery, said battery having a first terminal coupled to the anode and the first diode and said battery having an opposite bias second terminal coupled to said grid electrode lines, said cathodes of each of said first and second diodes being coupled to said cathode lines of said electrophoretic display, said anode of said second cathode being coupled to said anode of said electrophoretic display, whereby electrophoretic particles of said electrophoretic display remain in a substantially constant position when said electrophoretic displays detached form said electronic apparatus, thereby maintaining said predetermined image.

17. The electrophoretic display according to claim 16, wherein said means for removing said predetermined voltage potentials includes a means for disrupting the connection of said battery and said first diode to said grid and cathode lines.

18. The electrophoretic display according to claim 16, wherein said battery is between 1.5 volts and 3.0 volts.

* * * * *